Jan. 26, 1971    J. L. RUSSELL    3,558,687
HYDROCARBON OXIDATION WITH BORON ADDITIVES
Filed Aug. 4, 1966    2 Sheets-Sheet 1

INVENTOR
JOSEPH L. RUSSELL
BY
Donald J. Perrella
ATTORNEY

INVENTOR
JOSEPH L. RUSSELL

United States Patent Office 3,558,687
Patented Jan. 26, 1971

3,558,687
HYDROCARBON OXIDATION WITH BORON ADDITIVES
Joseph L. Russell, Ridgewood, N.J., assignor to Halcon International, Inc., a corporation of Delaware
Filed Aug. 4, 1966, Ser. No. 570,339
Int. Cl. C07c *35/08;* C07f *5/04*
U.S. Cl. 260—462
8 Claims

ABSTRACT OF THE DISCLOSURE

In a process for the oxidation of hydrocarbons, the improvement wherein the effluent gases are washed with a first stream of hydrocarbon to de-entrain boron materials, and the gases then contact a second stream of hydrocarbon to heat this second stream, and passing this heated hydrocarbon to the oxidation reactor.

---

Figure 1:
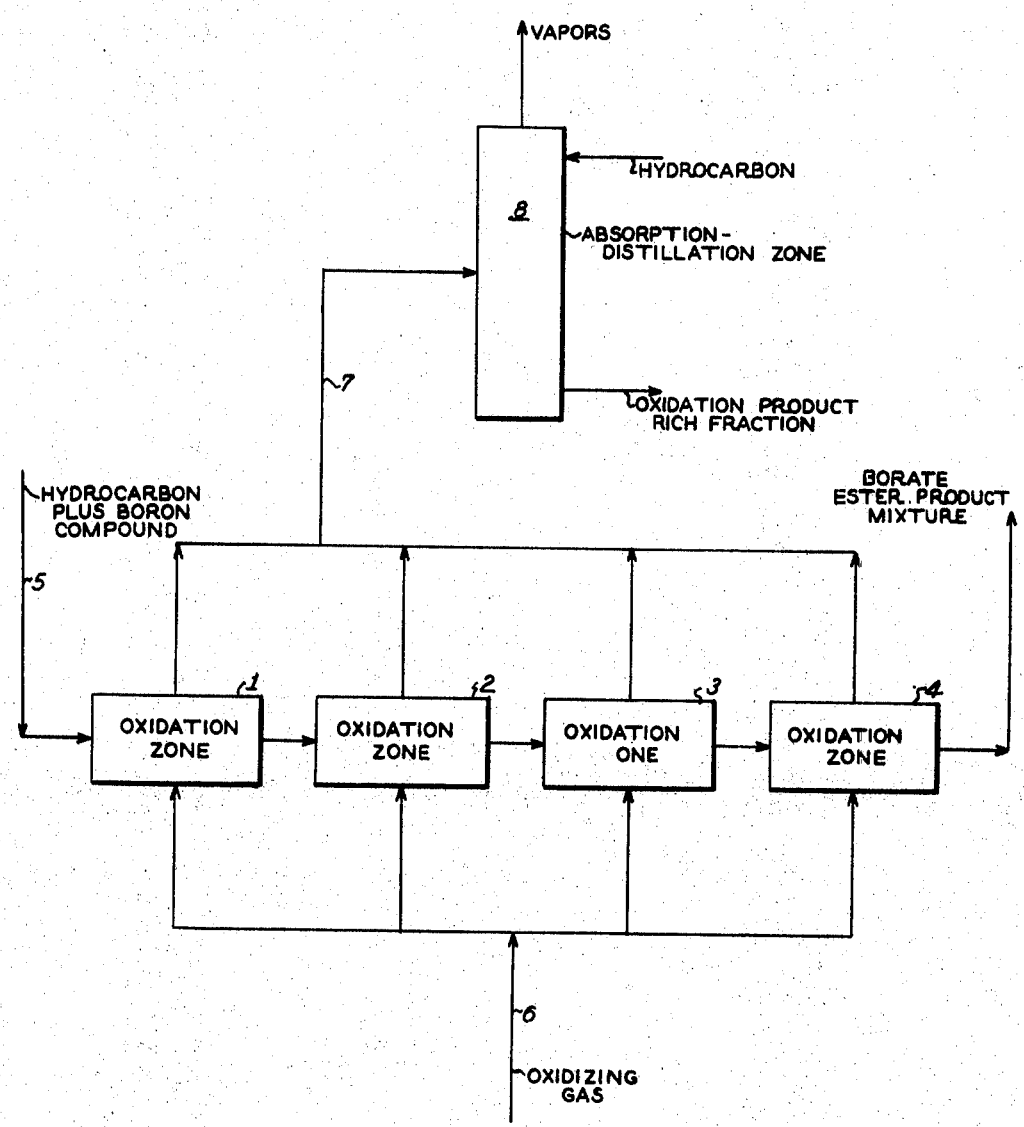

The present invention relates to the oxidation of hydrocarbons in the liquid phase with molecular oxygen in order to produce an oxidation mixture containing borate esters from which a product largely comprised of alcohol and ketone can be recovered. In particular, the invention relates to a continuous oxidation process which involves the provision of a boron adjuvant such as meta boric acid during the oxidation.

Extremely important strides have recently been made in the oxidation of hydrocarbons such as cyclohexane to produce an intermediate oxidation oil mainly comprised of the product alcohols and ketones.

A very important patent in this area which describes in detail the oxidation is recent U.S. Pat. 3,243,449.

In the said U.S. Pat. 3,243,449 there is provided a description of the elements necessary to carry out a lighter hydrocarbon oxidation in the presence of boric acid type additives while achieving a very significant improvement in reaction selectivities. The key feature of the oxidation is the control of exit water partial pressure in the gases leaving the reaction zone. As a practical matter, this control is conveniently achieved by carrying out the reaction such that there are very considerable quantities of hydrocarbon boil up as contrasted, for example, with older known methods for oxidizing cyclohexane. In such older methods water partial pressure did not assert a significant effect upon the reaction, and it was customary to carry out these older oxidations under conditions whereby hydrocarbon boil up was minimized since this was the most economic operation. The successful application of boric acid technology, however, has necessitated important changes in the techniques for carrying out the oxidation.

With the high hydrocarbon boil up rates, certain problems not present in previous technology have been encountered. Specifically, amounts of oxidation products are carried over with the hydrocarbon vapors which upon recycle tended to be converted to undesirable products thus resulting in a significant depression of process performance.

It is an object of the present invention to provide a further improvement in a process dealing with the molecular oxygen oxidation of a hydrocarbon in the presence of a boron adjuvant.

It is a particular object of the invention to provide an improved method whereby significantly increased yields of product alcohol and ketone can be obtained from such oxidation processes.

Other objects will become apparent from the following description of the invention.

The accompanying figures represent in diagrammatic form embodiments of the invention.

The oxidation conditions of temperature, pressure, maintenance of water partial pressure and the like, plus types and amount of boron additives such as boric acid and lower hydrates of boric acid, are as set forth in recently issued U.S. Pat. 3,243,449. The invention which is here concerned is a continuous oxidation system such as is illustrated in the accompanying figures.

The invention is especially adapted for the oxidation of cyclohexane although the invention has general applicability. The advantages of the invention are realized most importantly with the lighter hydrocarbons such as the $C_4$ to $C_8$ saturated aliphatic and alicyclic hydrocarbons.

Referring to the attached FIG. 1, hydrocarbon is continuously oxidized in a series of oxidation zones 1, 2, 3, and 4. A slurry of hydrocarbon and boron adjuvant such as meta boric acid is introduced into zone 1 by means of line 5. Oxidizing gas is introduced by means of line 6. The oxidation zones are maintained under appropriate conditions such that the hydrocarbon oxidation proceeds in the liquid phase at a satisfactory rate with a high degree of selectivity. As will be apparent from a consideration of the oxidation conditions as set forth in said Pat. 3,243,449, the water partial pressure in the oxidation zones must be maintained at a low figure. This involves the provision of a high boil up rate of hydrocarbon. A vapor mixture containing predominantly hydrocarbon, water of reaction, and nitrogen is continuously removed from the oxidation zones by means of line 7. It has been discovered that this vapor mixture contains a very significant percentage of the alcohol and ketone which is formed during the oxidation sequence together with significant amounts of hydroperoxide oxidation product. In point of fact, as much as 30% of the alcohol and ketone values (including those desirable from the hydroperoxide) formed as a result of the oxidation may be present in the overhead vapors exiting from the oxidation by means of line 7.

Essential to practice of the invention is the recovery from the vapor mixture of a fraction which is enriched in these valuable oxidation products and the subsequent processing of the recovered fraction in a manner that allows for the attainment of a much higher net selectivity.

In one embodiment the vapors from the oxidation zones can be cooled and the organic materials condensed. The condensate representing a liquid fraction enriched in the valuable oxidation products having the same carbon structure as the hydrocarbon can be treated for the optimum recovery of the products.

Preferably, however, the vapor mixture which is continuously removed from the oxidation zone by means of line 7 is contacted with liquid, relatively cold, hydrocarbon in absorption-distillation zone 8 and there is recovered via line 9 a fraction which is enriched in hydrocarbon oxidation products which have the same carbon structure as the hydrocarbon. The oxidation products having the same carbon structure as the hydrocarbon include the alcohol, ketone, peroxide, hydroperoxide, and the like oxidation products.

It is within the scope of the present invention to subject the recovered fraction which is enriched in said hydrocarbon oxidation products to a number of procedures in order to increase the overall yields from the process. In one embodiment, the oxidation product rich fraction is subjected to a hydrogenation treatment in order to convert the ketone, peroxides and hydroperoxides to the corresponding alcohol. The resulting alcohol fraction can be worked up for alcohol recovery or recycled to the oxidation zone.

As another alternative which is somewhat less advantageous the recovered fraction from the distillation can itself be recycled to the oxidation zone preferably to an intermediate point in the series of oxidation zones. Alternatively, the fraction can be combined with the overall product fraction from the oxidation and separated by distillation.

Essential to the present invention is the concept of recovering from the oxidation effluent vapors a fraction which is enriched in the oxidation products. In prior techniques which did not involve the recovery of the fraction, the oxidation products remained with the hydrocarbon. As a result of the processing procedures to which the hydrocarbon containing the oxidation products was subjected, the products were converted to undesirable further products.

For example, in a preferred oxidation technique, heat is provided to the oxidation by means of a vaporized recycle hydrocarbon. However, where the hydrocarbon stream to the vaporizer is part of the condensate from the oxidation effluent vapors, and contains hydroperoxide, the hydroperoxide decomposes inefficiently at the severe vaporizer temperatures thus resulting in overall yield loss.

Similarly, the hydrocarbon condensate from oxidation effluent vapors is customarily returned to the first of the series of oxidation reactions. Where this condensate contains ketone oxidation product, the ketone tends to undergo further, undesirable oxidation in the oxidation zones thus lessening overall product yields.

Through practice of the present invention, the recovered fraction enriched in these valuable oxidation products can be subjected to closely controlled further treatments in order to more effectively recover the important product values which are contained in the fraction.

Figure 2:
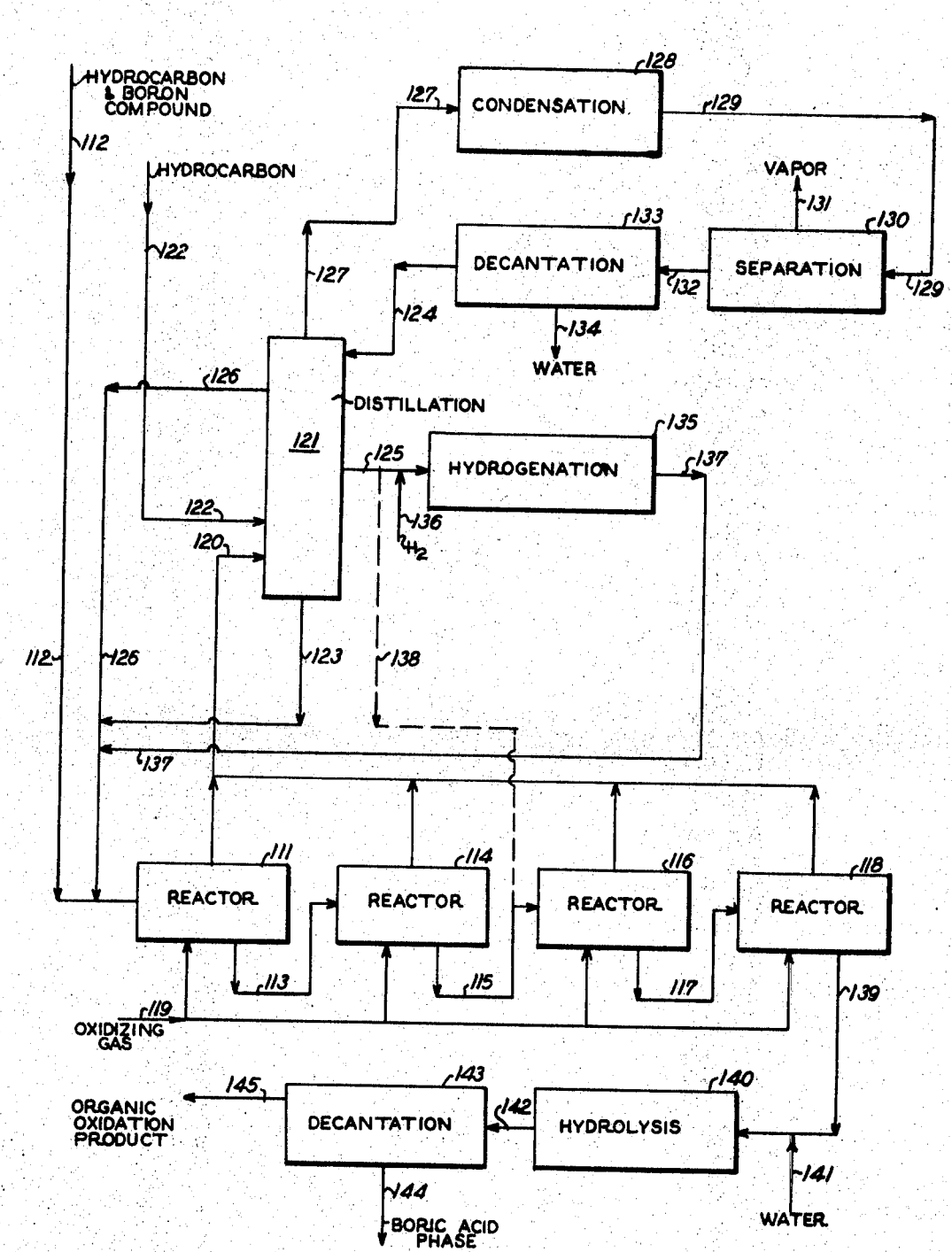

A particularly preferred embodiment of the present invention is described in FIG. 2 of the attached drawings. Referring to this FIG. 2 the feed hydrocarbon which is more preferably cyclohexane together with the boron adjuvant is introduced into the first reactor 111 in a series of four reactors. The hydrocarbon and boron compound is introduced via line 112. The hydrocarbon is oxidized in each reactor with the reaction mixture from reactor 111 passing via line 113 to reactor 114, the reaction mixture from 114 passing via line 115 to reactor 116, the mixture from 116 passes via line 117 to reactor 118 which is the last of the four reactors in series. Hydrocarbon is oxidized in each of the reactors by contact with molecular oxygen introduced in the form of a mixture of oxygen with nitrogen via line 119. The reaction in each of the reactors is carried out in accordance with the high boil up low water partial pressure conditions specified in recent U.S. Pat. 3,243,449. Vapors from each reaction zone comprising the hydrocarbon, inert gases, water, and hydrocarbon oxidation products such as alcohol, ketone, and hydroperoxide having the same carbon structure as the feed hydrocarbon are continuously removed via line 120 from the oxidation reactors. In accordance with the present invention, this vapor mixture passes into distillation zone 121 wherein a separation which is necessary to practice of the invention takes place.

In a particularly preferred embodiment as described in FIG. 2, the lower section of distillation zone 121 is a de-entraining zone. Liquid cooled hydrocarbon is introduced via line 122 and in the bottom few trays scrubs out entrained solid boric acid or borate esters which might be carried over in the gases from the oxidation zone and which eventually would interfere with vaporizer operation. A liquid stream containing the scrub boron materials is returned via lines 123 and 112 back to the oxidation system.

Above the de-entraining zone, the vapors are contacted with cooled liquid hydrocarbon introduced through line 124 and a fractional distillation occurs. At a lower point in the distillation zone a stream which is enriched in the oxidation products, i.e., alcohol, ketone, hydroperoxide, and the like is withdrawn by means of line 125. At a point above this withdrawal, a stream of substantially pure hydrocarbon is withdrawn through line 126 and is returned to the oxidation system, preferably after first being partially vaporized (not shown) to a point necessary to provide heating in the oxidation zones. Although this stream is shown as returning by means of lines 126 and 112 to the first oxidation zone, in actual practice the stream is distributed throughout all of the oxidation zone and the amount is sufficient to provide the heat necessary in each zone to sustain the reaction.

The vapor mixture passing overhead from zone 121 travels via line 127 to condensation zone 128 wherein the vapors are cooled to a point sufficient to condense the condensible components. The cooled mixture passes via line 129 to separation zone 130 wherein a liquid vapor separation takes place. The vapors which mainly comprise inerts pass through line 131. A portion of these vapors is purged while preferably a portion is used to dilute air and form the oxidizing gas feed. Condensed liquid passes from zone 130 via line 132 to decantation zone 133. In this zone, the condensate separates into a lower aqueous phase and an upper organic phase. The aqueous phase is removed through line 134 and is normally discarded. The organic phase passes via line 124 into zone 121 to provide liquid hydrocarbon for the fractional distillation step.

In the most advantageous practice of the invention the solution of oxidation products in hydrocarbon passes via line 125 to hydrogenation zone 135. Hydrogen is introduced via line 136 and the mixture is subjected to a controlled hydrogenation reaction whereby both hydroperoxide and ketone are converted to the corresponding alcohol. Most preferably this hydrogenation is a liquid phase reaction although vapor phase technology can also be employed. Known type hydrogenation catalysts including nickel, copper, chromium, zinc and the like as well as mixtures thereof in supported or unsupported form can be employed to accomplish this hydrogenation. The effluent from the hydrogenation zone after separation of hydrogen (which is not shown) is recovered via line 137. This effluent comprises essentially a solution of alcohol oxidation product in the hydrocarbon.

In a particularly advantageous practice of the invention, the hydrogenation effluent is recycled back to the oxidation system, and preferably to reactor 111. Alternatively, the hydrogenation effluent is worked up as by fractional distillation in order to recover the valuable oxidation product and to separate hydrocarbon for recycle. It is advantageous to recycle the hydrogenation effluent back to the oxidation system as shown via lines 137 and 112 as the presence of the alcohol tends to enhance the oxidation reaction and the alcohol is not subject to significant further degradation upon passage through the oxidation zones. The less preferable embodiment wherein the hydrogenation effluent is directly worked up for alcohol recovery is not illustrated in the accompanying drawing although it will be understood that straight forward distillation techniques can be employed to accomplish this separation.

As an alternative to the above which, although within the scope of the invention is less desirable, the stream passes from distillation zone 121 via line 125 and is returned directly to the oxidation system. As shown by the dotted line 138 in the drawing, the fraction can be returned, for example to oxidation zone 116. The fraction could be returned to any or all of the oxidation zones but since contained ketone tends to undergo significant degradation upon passage through the oxidation zones it is preferred to pass at least part of the fraction to an intermediate zone. The advantage of this invention largely stems from the fact that contained hydroperoxide undergoes a more efficient conversion to alcohol and/or ketone in the oxidation zones than it would, for example, upon being subjected to the more elevated temperature in the vaporizer.

The oxidation mixture from the last oxidation zone 118 is removed via line 139 and passed to hydrolysis zone 140. Water is added via line 141 and the borate esters contained in the reaction mixture are hydrolyzed to boric acid plus alcohol in zone 140. The hydrolysis mixture passes via line 142 to decantation zone 143 wherein a lower aqueous boric acid phase is separated via line 144 and an organic oxidation product solution in hydrocarbon is separated via line 145.

Preferably the aqueous boric acid phase is treated as by crystallization to recover boric acid values which after dehydration are desirably recycled to the oxidation.

The product-hydrocarbon mixture is worked up in accordance with known procedures to recover the ketone-alcohol product oil.

Through practice of the present invention, very real and very important improvements in the yields of ketone and/or alcohol are achieved in this oxidation system. For example, total yield increases of the order of 10% or more are obtainable by the practice of this invention. With the tremendous tonnages of adipic acid resulting from this technology it will be appreciated that such an increase in yield truly represents an outstanding process improvement.

The following example will illustrate the invention.

A cyclohexane oxidation is carried out in accordance with the embodiment set forth in the attached FIG. 2. A slurry of cyclohexane containing 20% by weight meta boric acid is introduced into oxidation zone 111, continuously, together with recycle cyclohexane which is introduced via line 126 and 123 and recycle hydrogenation effluent via line 137. The oxidizing gas which comprises by volume 10% oxygen and 90% nitrogen is introduced via line 119 and is distributed to the reactors in the series in order to provide for the desired conversion in each reaction zone. Per 100 mols of cyclohexane plus oxidation products withdrawn from the last reactor the oxidation is carried out such that 25 mols react in reactor 111, 25 mols in reactor 114, 25 mols in reactor 116 and 25 mols in reactor 118. The effluent withdrawn from the fourth reactor and passed via line 139 to hydrolysis zone 140 contains 91 mol percent cyclohexane, the remainder being predominantly cyclohexyl borate ester.

The oxidation in zones 111, 114, 116 and 118 is carried out at 165° C. and 125 p.s.i.g. Heat input is provided (not shown) by injection of externally vaporized cyclohexane in order to provide a high rate of cyclohexane boil up. The composition of the combined effluent gases from the reactors passing through line 120 is 73.5 percent cyclohexane, 23.0 percent nitrogen, 3 percent water, and 0.5 percent cyclohexanol plus cyclohexanone, 0.3 percent cyclohexyl hydroperoxide as well as 200 p.p.m. expressed as boron of entrained boric acid and/or borate ester. Per 100 mols of cyclohexane plus oxidation products removed via line 139, 400 mols of cyclohexane vapor are removed via line 120.

The vapors from the oxidation zone are passed to fractionation-heat exchange zone 121. This zone is a bubble tray distillation column having 10 theoretical plates. The vapors are introduced near the bottom of the said zone with 340 mols recycle liquid cyclohexane being introduced via line 124 near the top. In the lower part of the zone 121 the vapors are contacted with liquid cyclohexane which is introduced in amount of 40 mols via line 122 to de-entrain boric acid and borate ester. 50 mols liquid cyclohexane plus removed boron material passes back to zone 111 via lines 123 and 112. The vapors travel upwardly through zone 121 and contact the downwardly passing cyclohexane whereby heat is exchanged and fractionation occurs. The cyclohexane vapors in amount of 340 mols removed overhead from zone 121 via line 127 at 150° C. and 138 p.s.i.a. are substantially free of cyclohexanol, cyclohexanone, and cyclohexyl hydroperoxide and contain by volume about 22.5 percent nitrogen, 3.5 percent water and 73.0 percent cyclohexane. At an intermediate point 3 trays below the top 200 mols of a liquid stream comprising cyclohexane substantially free of cyclohexanol, cyclohexanone, and cyclohexyl hydroperoxide is withdrawn and recycled to the oxidation zone through lines 126 and 112.

The vapors from zone 121 are condensed by cooling in zone 128 to a temperature of 40° C. and the condensed mixture passes via line 129 to separation zone 130. Non-condensed gases are removed via line 131 and the liquid condensate passes via line 132 to decantation zone 133. A lower aqueous phase is removed via line 134, and discarded. The cyclohexane phase is removed and passes via line 124 to zone 121.

A liquid stream from zone 121 in amount of 190 mols and containing cyclohexane and 1.7% by weight cyclohexanol and cyclohexanone and cylohexyl hydroperoxide is removed 8 trays from the top. This fraction passes via line 125 to hydrogenation zone 135 wherein the fraction is subjected to a selective hydrogenation and the ketone and hydroperoxide are converted to cyclohexanol. Hydrogen in amount of 12 mols is added via line 136 and the hydrogenation is carried out in the liquid phase at 165° C. and 190 p.s.i.a. using a copper catalyst. The hydrogenation effluent after separation of hydrogen comprises a solution of 2.2% by weight cyclohexanol in cyclohexane. This effluent in amount of 190 mols is recycled via lines 137 and 112 to the first oxidation zone 111.

The reaction mixture from oxidation zone 118 is removed by means of line 139 and subjected to a hydrolysis in zone 140. Water in amount necessary to accomplish the hydrolysis is added by means of line 141. The hydrolysis is carried out at 80° C.

The hydrolysis reaction mixture passes by means of line 142 to decantation zone 143 wherein the reaction mixture is separated into a lower aqueous boric acid phase and an upper organic phase comprising a solution of oxidation product in cyclohexane. The upper phase passes to a distillation (not shown) wherein by distillation unreacted cyclohexane is separated from product ketone alcohol oil. This latter oil comprises 93% cyclohexanol and cyclohexanone.

By way of comparison, where the vapor effluent from the oxidizers is condensed and recycled to the first oxidation zone, a portion being vaporized before returning to the oxidation, the overall product yield is only 82%.

Further, where the solution of cyclohexanol in cyclohexane from hydrogenation zone 135 is combined with the oxidation mixture in line 145 and the resulting mixture is distilled to separate product cyclohexanol and cyclohexanone, the product yield is 92%.

Where the mixture removed via line 125 from zone 121 is not hydrogenated but is recycled to zone 116 via line 138 product yield is 86%.

Where the mixture removed from zone 121 via line 125 is combined with mixture in line 145 and the resulting mixture is distilled, the yeild is 90%.

From the foregoing it will be apparent that the practice of the invention results in very significant yield improvements and that many practices of the invention are possible.

What is claimed is:

1. In a process for the oxidation of a saturated aliphatic or cycloaliphatic hydrocarbon in the liquid phase with a molecular oxygen containing gas and in the presence of a boron compound selected from the group consisting of boric acid and lower hydrates or boric acid, wherein a vapor mixture containing said hydrocarbon, oxidation products of said hydrocarbon having the same carbon structure as said hydrocarbon, water and inerts is continuously removed during the oxidation, the improvement which comprises passing said vapors into a distillation zone and scrubbing said vapors with a liquid stream of said hydrocarbon to de-entrain boron materials, with the scrubbing liquid hydrocarbon and boron materials being returned to the oxidation zone, removing a stream enriched in oxidation products from said distillation zone, and contacting the scrubbed vapor with a separate second stream of said hydrocarbon in order to heat this second stream with at least a portion of the second stream being vaporized and introduced to the oxidation zone.

2. A process according to claim 1 wherein at least part of said enriched fraction is hydrogenated.

3. A process according to claim 2 wherein at least part of said hydrogenated fraction is recycled to the oxidation zone.

4. A process according to claim 2 wherein at least part of said hydrogenated fraction is treated to separate at least part of the alcohol content thereof.

5. A process according to claim 1 wherein at least part of said enriched fraction is returned directly to the oxidation zone.

6. A process according to claim 1 wherein unreacted hydrocarbon is separated from the enriched fraction.

7. A process according to claim 1 wherein the hydrocarbon contains from 4 to 8 carbon atoms.

8. A process according to claim 7 wherein the hydrocarbon is cyclohexane.

References Cited

UNITED STATES PATENTS

| 3,243,449 | 3/1966 | Winnick | 260—586B |
| 3,384,672 | 5/1968 | Illingworth | 260—586B |
| 2,736,755 | 2/1956 | Reuter | 260—586B |

FOREIGN PATENTS

| 1,146,876 | 4/1963 | Germany | 260—586B |

BERNARD HELFIN, Primary Examiner

L. De CRESCENTE, Assistant Examiner

U.S. Cl. X.R.

260—586, 631, 632, 617